United States Patent [19]

Stempeck

[11] 4,374,613
[45] Feb. 22, 1983

[54] AUTO/MANUAL CAMERA EMPLOYING COMMON LENS FOCUSING DATA

[75] Inventor: John W. Stempeck, Reading, Mass.

[73] Assignee: Polaroid Corporation, Cambridge, Mass.

[21] Appl. No.: 270,238

[22] Filed: Jun. 4, 1981

[51] Int. Cl.³ .............................................. G03B 3/10
[52] U.S. Cl. .................................................... 354/196
[58] Field of Search ................... 354/25 R, 25 N, 195, 354/196

[56] References Cited

U.S. PATENT DOCUMENTS

| | | | |
|---|---|---|---|
| 4,196,987 | 4/1980 | Erlichman | 354/23 D |
| 4,219,261 | 8/1980 | Rosner et al. | 354/196 |
| 4,227,790 | 10/1980 | Shenk | 354/195 |
| 4,291,965 | 9/1981 | Johnson et al. | 354/195 |

*Primary Examiner*—Russell E. Adams
*Attorney, Agent, or Firm*—John J. Kelleher

[57] ABSTRACT

A photographic camera having both automatic and manual focusing modes of operation includes apparatus for establishing an electrical signal representative of lens focus position for lens focusing related purposes when in its automatic focusing mode of operation, is capable of generating this electrical signal for camera functions other than lens focusing by automatically positioning the lens from its initial manually focused position to a reference position and then back to its initial position, when the camera is operated in its manual focus control mode.

13 Claims, 5 Drawing Figures

AUTO/MANUAL CAMERA EMPLOYING COMMON LENS FOCUSING DATA

BACKGROUND OF THE INVENTION

1. Field of the Invention

The present invention relates to apparatus for automatically and manually focusing an adjustable focus lens, in general, and to such apparatus for focusing and adjustable focus lens in a photographic camera having both automatic and manual focusing modes of operation, in particular.

2. Description of the Prior Art

Photographic cameras having both automatic and manual focusing modes of operation are presently available in the prior art. One such camera is sold by the Polaroid Corporation under its registered trademark SX-70 Sonar One-Step. In the automatic focus control mode, a focus control system is coupled to the adjustable focus lens of said camera and positions the lens to a focus position in accordance with an ultrasonic rangefinder derived signal representative of the distance to a subject to be photographed. In the manual focus control mode, an optical rangefinder is coupled to the adjustable focus lens; the automatic focus control system being disabled when said manual focus control mode is selected. A follow-focus arrangement is employed in that aperture adjustment and flash illumination output are mechanically coupled to lens focus position in order to correlate subject distance with the appropriate aperture size and/or flash illumination output.

Providing both automatic and manual focus control capabilities in a photographic camera substantially improves the range of conditions over which a photographic image can be produced and the quality of a photographic print produced with such an image. However, if both automatic and manual focusing capabilities are to be provided in a photographic camera, it would appear that camera size and/or cost would logically have to increase in order to house the hardware that provides such capabilities.

In the photographic camera noted above, for example, camera size and cost are increased when providing these capabilities because hardware employed to provide range information in one camera focusing mode of operation is functionally duplicated with additional hardware when providing the same range information in the other camera focusing mode of operation.

SUMMARY OF THE INVENTION

In accordance with the teachings of the present invention, a photographic camera having both automatic and manual focusing modes of operation is provided with a manual focus control system that produces an electrical signal representative of lens focus position which may be employed to set aperture size and/or timing functions that control film exposure. When a picture taking sequence is initiated after the camera is in its manual focus control mode of operation, means are provided including the operation of portions of the automatic focus control system that will move the camera lens between its initial position and a known reference position, sense the extent of said lens movement, produce an electrical signal representative of said lens movement, return said lens to its said initial position and then initiate and complete the exposure of a photographic film unit.

DESCRIPTION OF THE PREFERRED EMBODIMENTS

Figure 1:
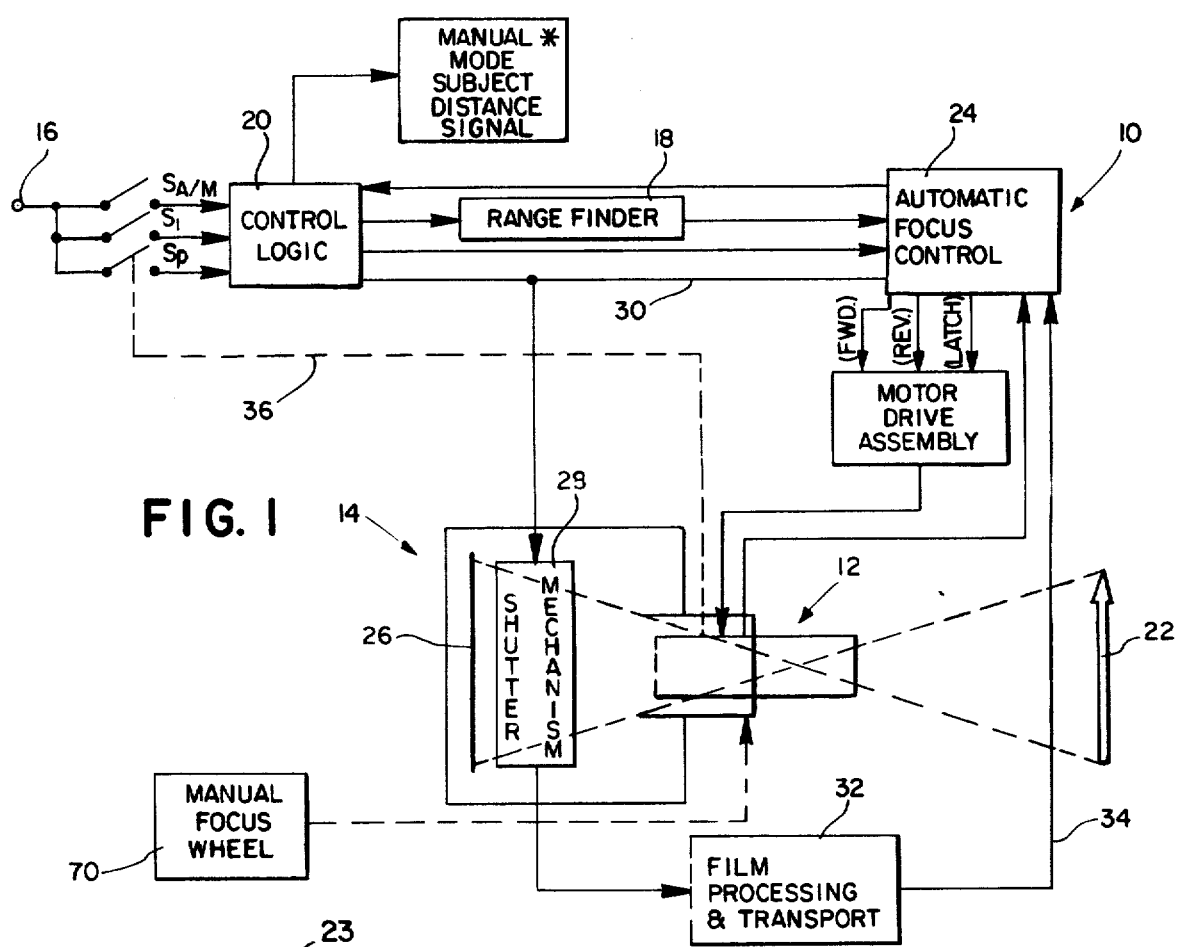
FIG. 1 is a schematic diagram of an automatic and manual focus control system for an adjustable focus lens camera constructed in accordance with a preferred embodiment of the present invention.

Referring now to the drawings and specifically to FIG. 1, a schematic diagram of manual and automatic focus control system 10 for adjustable focus lens 12 of self-processing camera 14 is depicted. The automatic focus control portion of said control system 10, when operated in the automatic focus control mode, is described in detail in U.S. patent application Ser. No. 13,681 filed Feb. 21, 1979 by EDWIN K. SHENK now U.S. Pat. No. 4,348,089. The automatic focus control portion of focus control system 10 is of the unidirectional type in that while the movable element of lens 12 can be and is moved in either of two possible directions, focusing movement for focusing purposes occurs in one direction only when moved from a known reference position that is always the same, to a desired subject-in-focus position. This known reference position from which all automatic focusing is initiated is referred to herein as the adjustable focus lens 12 "park" position.

In order to automatically focus adjustable focus lens 12, both mode select switch $S_{a/m}$ and switch $S_I$ must be actuated to their closed positions. If switches $S_{a/m}$ and $S_I$ are actuated to their closed positions, a portion of the source of power from an internal camera 14 battery (not shown) which is connected to terminal 16 will be routed to the input of rangefinder 18 through control logic 20, thereby activating said rangefinder 18. When so activated, rangefinder 18 acoustically determines the distance to a subject to be photographed such as subject 22. A more detailed explanation of how rangefinder 18 determines distance to a remote subject is provided in said above-cited SHENK application.

Figure 2:
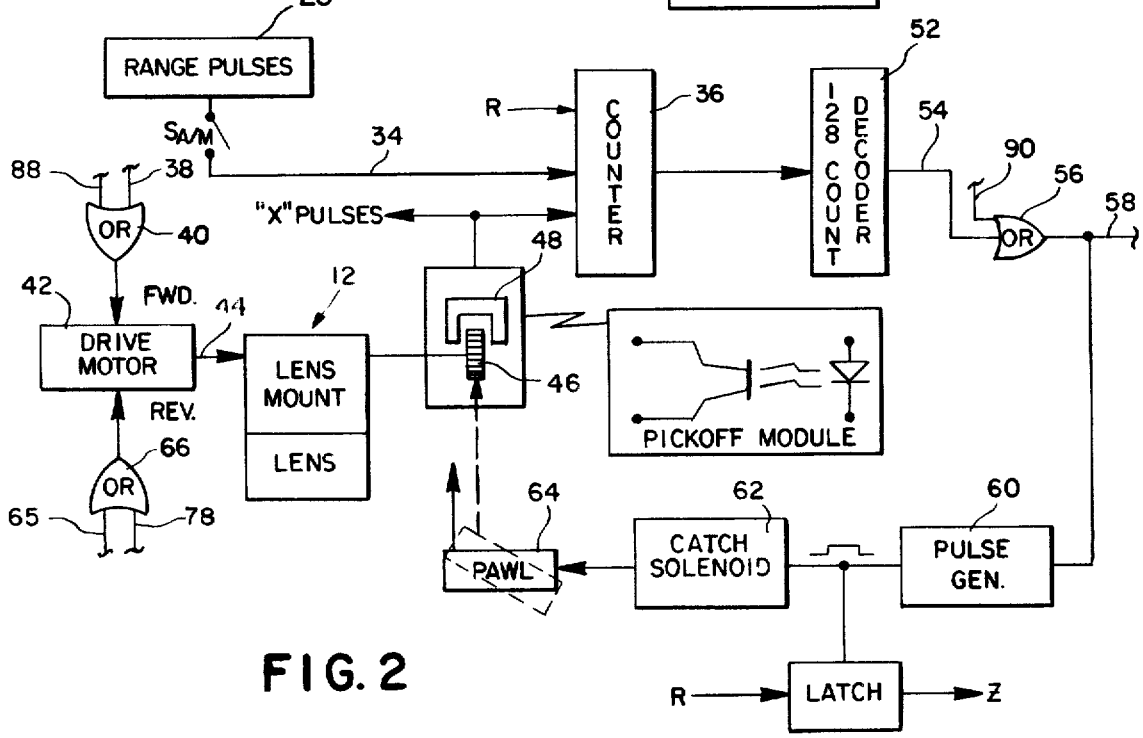
FIG. 2 is a portion of the automatic and manual focus control system of FIG. 1, shown in greater detail.

Referring at this point to both FIGS. 1 and 2, when the distance to subject 22 has been determined, range pulses 23 from rangefinder 18 representative of said distance are routed through path 34 and stored in range pulse counter 36. When a lens-forward positioning signal is produced by automatic focus control 24, which occurs after the distance to subject 22 has been ultrasonically determined, it is routed through path 38 and OR gate 40 to drive motor 42 which is mechanically coupled to adjustable focus lens 12 through path 44. Encoder wheel 46 is rotatably mounted and mechanically coupled to lens 12. Pick-off module 48 includes a light emitting diode and a light sensing transistor. These components are shown in greater detail in FIG. 3. When lens 12 is positioned to a desired focus position by the forward rotation of drive motor 42, encoder wheel 46 rotates in response to such motor rotation are slots 50 (FIG. 3) in said encoder wheel 46 alternately block and unblock the light being transmitted between the light emitting diode and the light sensitive transistor in pick-off module 48 thereby generating pulses that are representative of the position of the movable element of lens 12. The pulses from pick-off module 48, also referred to herein as "X" pulses, are routed to pulse counter 36. When the number of pulses in counter 36 from rangefinder 18 and pick-off module 48 equal a combined total of 128, 128 count decoder 52 generates output signal 54 indicating that the focusing of lens 12 is complete. Focus complete signal 54 is routed to the drive motor 42 control circuit (not shown) through OR gate 56 and path 58 to deenergize drive motor 42, and to pulse generator 60 through said OR gate 56. Focusing complete signal 54 causes pulse generator 60 to generate a 20 millisecond pulse which is applied to catch solenoid 62, causing said solenoid 62 to move pawl 64 into mechanical engagement with and thereby arrest the motion of encoder wheel 46 and the movable element of lens 12 to which said wheel 46 is mechanically coupled. At this point, an image of object 22 will be in focus at image plane 26 of camera 14 when shutter mechanism 28 is subsequently actuated.

As mentioned above, camera 14 is of the self-processing type and, therefore, once the actuation of shutter mechanism 28 is complete after an image of a subject to be photographed has been ultrasonically focused at image plane 26, film processing and transport cycle 32 is initiated. This cycle initiates film processing and film movement out of said camera 14. If switch $S_I$ is in its open position when film processing and transport cycle complete signal 34 is applied to automatic focus control 24, said automatic focus control 24 will apply a motor reverse signal to drive motor 42 through path 65 and OR gate 66, causing the movable element of adjustable focus lens 12 to be driven by motor 42 to the point where a lens movement actuated switch, designated $S_p$ herein, is actuated to its open position by adjustable focus lens 12 movement that is coupled to said lens 12 through mechanical linkage 36 (FIG. 1).

Figure 3:
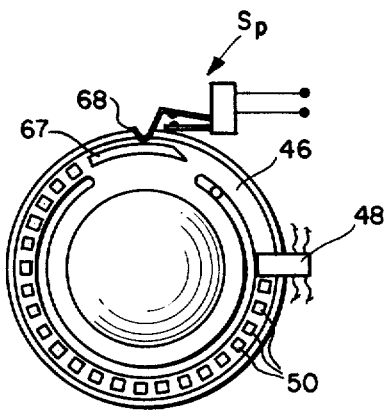
FIG. 3 is an enlarged detail of the lens focus position encoder wheel shown in FIG 2.

Referring additionally to FIG. 3, when the movable element of lens 12 is moved a sufficient distance outside of its normal focusing range (preferably beyond its infinity focus position) cam 67 on encoder wheel 44, which is mechanically coupled to said movable lens element, engages arm 68 of switch $S_p$ and thereby opens said switch $S_p$. Switch $S_p$ is sometimes referred to herein as the "park" switch and when the movable element of lens 12 is in the position where switch $S_p$ is actuated to its open position, said lens 12 is considered to be in its park position or the above-mentioned known reference position from which all ultrasonic focusing of adjustable focus lens 12 of camera 14 is initiated.

In the manual focus control mode, the actual focusing of adjustable focus lens 12 is accomplished by the manual rotation of focus wheel 70 (FIG. 1) which is mechanically coupled to the movable element of said lens 12 when camera 14 is in its manual focus control mode. In order to take a picture in the manual focus control mode, mode select switch $S_{a/m}$ must be moved to its manual or open position before a film exposure, processing and transport cycle is initiated. The primary effect of placing mode switch $S_{a/m}$ in its manual mode is to prevent ultrasonic rangefinder focusing of adjustable focus lens 12, thereby enabling a camera operator to focus said lens 12 by manually rotating said focus wheel 70 as the subject to be photographed is viewed through a through-the-lens viewfinder (not shown).

Figure 4:
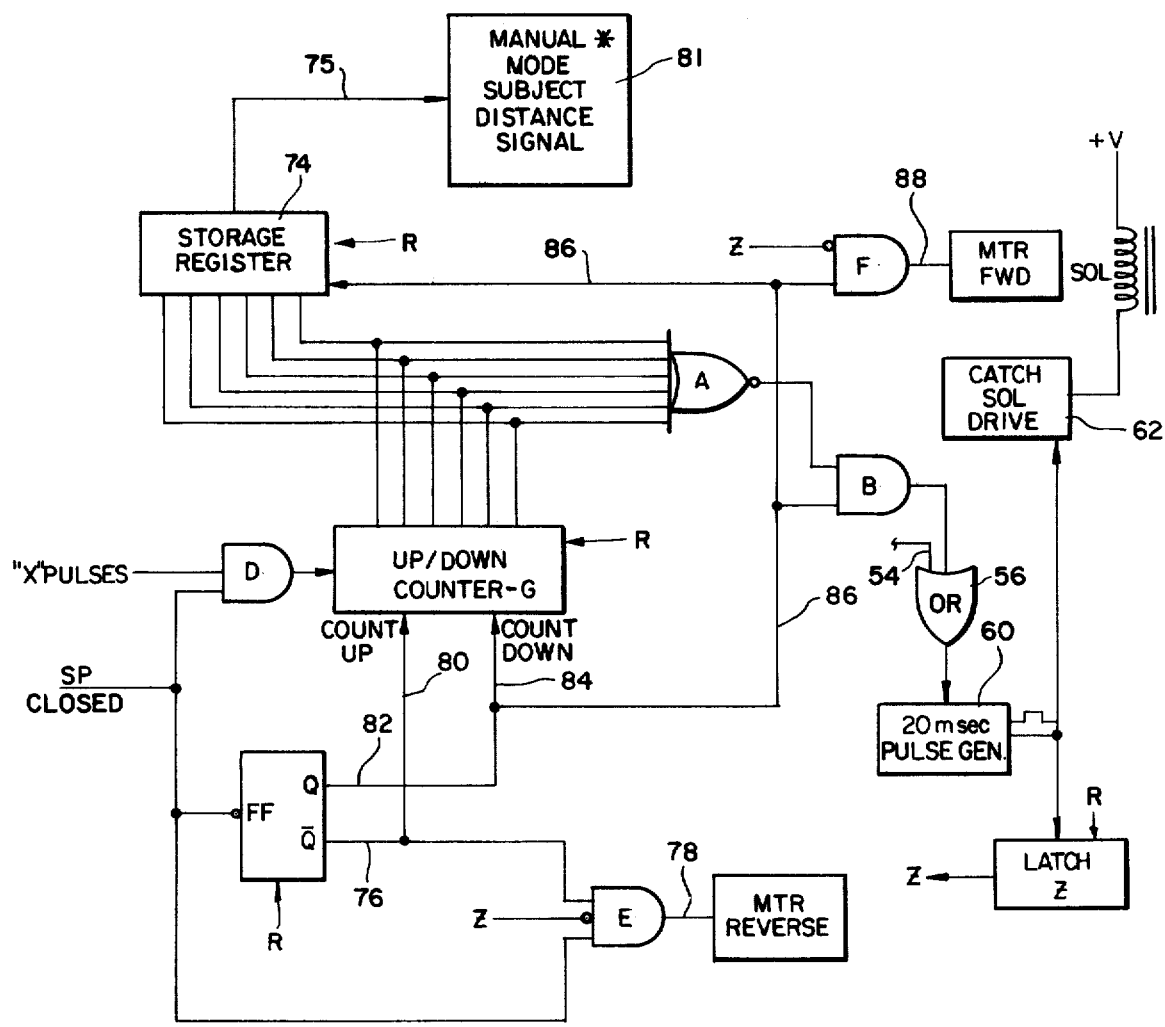
FIG. 4 is a logic diagram showing the control logic that operates portions of the automatic control system when the camera is operated in its manual focus control mode.
Figure 5:
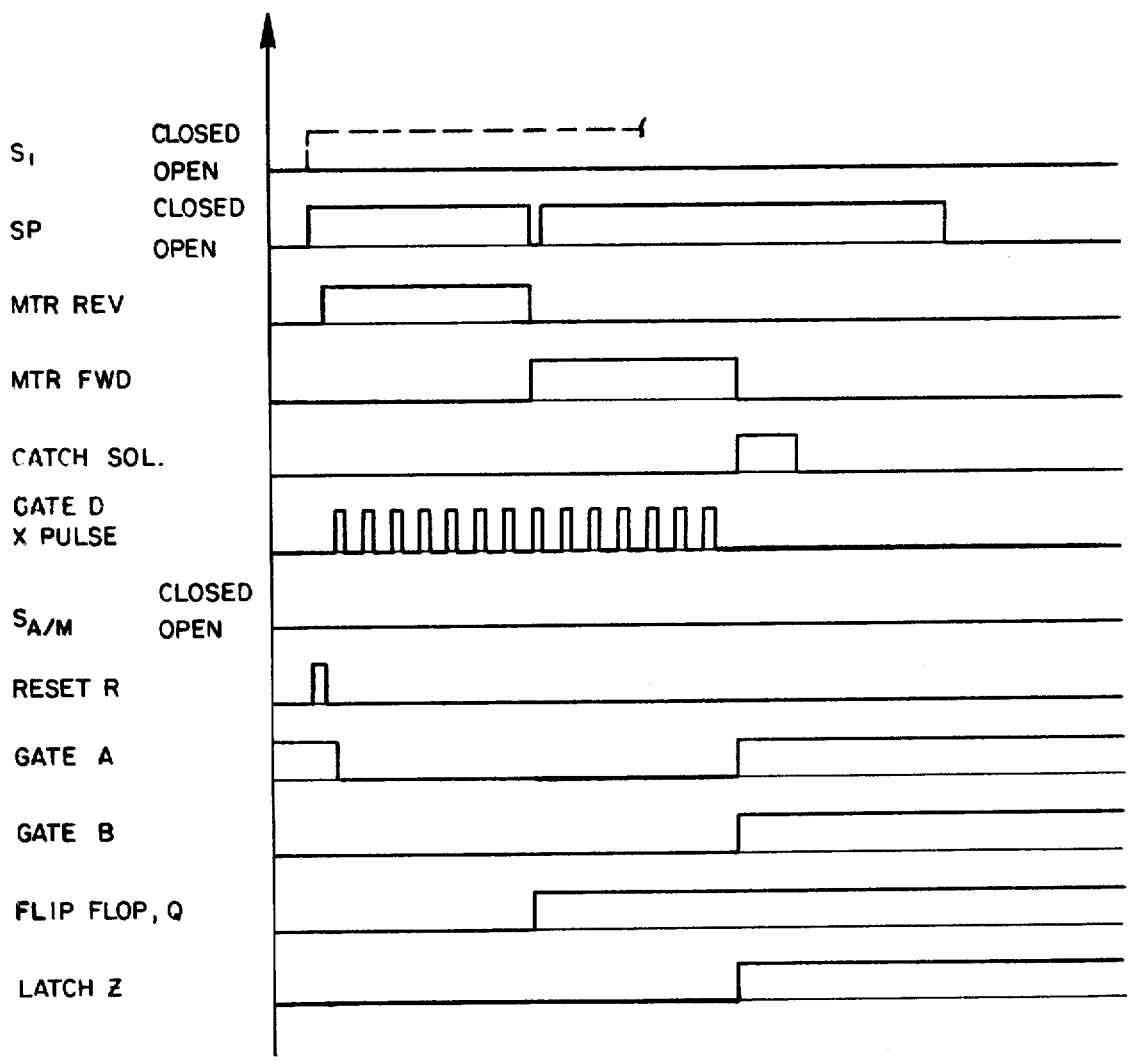
FIG. 5 is a time line of the operation of the focus control system portion of FIG. 4.

FIG. 4 is a logic diagram showing the control logic of that portion of focus control system 10 (FIG. 1) that operates portions of the automatic focus control system when camera 14 (FIG. 1) is operated in its manual focus control mode. FIG. 5 is a timing diagram of switch positions, the state of signal controlling gates, etc. and other events that occur when a film exposure, processing and transport cycle is initiated while camera 14 is in its manual focus control mode of operation. Turning additionally to FIGS. 4 and 5, when focusing mode select switch $S_{a/m}$ is moved to its manual focus control mode position ($S_{a/m}$ open), range pulses 32 from ultrasonic rangefinder 18 (FIGS. 1 and 2) will be unable to reach pulse counter 36 through path 34 for automatic lens focus control purposes. Focusing of adjustable focus lens 12 is accomplished by rotating manual focus wheel 70 while looking through a viewfinder (not shown) and the image forming optics of lens 12 to which said viewfinder is optically coupled. When the movable element of lens 12 is moved into the focusing range of said lens 12, lens actuated or park switch $S_p$ is actuated to its closed position. When film exposure initiating switch $S_I$ (FIG. 1) is actuated to its closed position, reset pulse R is generated thereby clearing up/down counter G, storage register 74, as well as other resettable logic devices. If switch $S_p$ is in its closed position when said switch $S_I$ is closed, any "X" pulses produced by lens position sensing pick-off module 48 as encoder wheel 46 rotates will be allowed to pass through AND gate D and into up/down counter G. If switch $S_I$ is closed while switch $S_p$ is closed, the output of flip flop Q present on path 76 and the closure of lens actuated switch $S_p$ turns on gate E causing a motor reverse signal to be generated at path 78 and at the output of OR gate 66 (FIG. 2) causing motor 42 to drive lens 12 from its manually focused focus position toward the lens 12 park position. The output signal from flip flop Q through paths 76 and 80 placed up/down counter G in its count-up mode. With switch $S_p$ closed, "X" pulses from pick-up module 48 caused by the reverse rotation of lens 12 coupled encoder wheel 46, will be routed to and counted by up/down counter G.

When lens 12 is driven to its park position or to the position where lens actuated switch $S_p$ opens, gate E opens and terminates the motor reverse signal appearing at the output of OR gate 66. The maximum number of pulses counted in up/down counter G is eventually stored in register 74. Output signal 75 of storage register 76 will be an electrical signal representative of the distance between camera 14 and a subject to be photographed. In addition to terminating said motor reverse signal, the opening of switch $S_p$ causes flip flop Q to change state and produce a signal on paths 82 and 84 that places up/down counter G in its count-down mode, and a signal on paths 82 and 86 that turns on gate F. The signal on said path 86 also tells storage register 74 to store the count in up/down counter Q that is present in said counter G at that time. The motor forward signal appearing at the output of gate F is applied to OR gate 40 (FIG. 2) through path 88 and to drive motor 42 causing said drive motor 42 to move the movable element of adjustable focus lens 12 back to its initial or manually focused focus position. As said movable lens element moves toward said manually focused focus position, park switch $S_p$ is closed and encoder or "X" pulses are produced by such lens movement. These "X" pulses pass through enabled AND gate D and are counted by up/down counter G. When the number of "X" pulses received by counter G resulting from the forward movement of lens 12 and encoder wheel 46 from the lens 12 park position toward its manually focused focus position equals the previously counted number of "X" pulses received by said counter G from pick-off module 46 resulting from the reverse movement of lens 12 from its initial or manually focused focus position toward its park position, NOR gate A at the output of counter G will conduct, thereby forcing AND gate B to conduct which, in turn, causes OR gate 56 to conduct through path 90 (FIGS. 2 and 4) and causes pulse generator 60 to produce a 20 millisecond pulse at its output. This 20 millisecond pulse is applied to catch solenoid drive 62, causing pawl 64 to physically engage and positively stop the rotation of encoder wheel 46. In addition, said 20 millisecond pulse is applied to and trips latch Z, thereby producing constant latch signal Z at its output and at the input to gates E and F. Applying latch signal Z to gates E and F opens said gates E and F, thereby deenergizing drive motor 42 and preventing either a forward or reverse drive motor signal from being applied to said drive motor 42 through said gates E and F.

DISCUSSION

In photographic cameras having both automatic and manual focusing modes of operation, the focus positions of the movable elements of the adjustable focus lens of such cameras is provided to the shutter mechanism, for example, in such cameras by a mechanical cam that catches the shutter blades at a particular focus-related aperture. To determine lens focus position electronically through, for example, a variable potentiometer or a grey-code network would be relatively expensive to implement.

As mentioned above, the present invention employs existing portions of the lens position-encoder and drive system of the automatic focus control system to derive focus information electronically prior to film exposure and after the camera has been manually focused while in its manual focus control mode of operation. This electronically derived focus information can be employed to, for example, set apertures and timing functions that control film exposure. This electronically derived signal may be employed to control an electrical stepping motor that, in turn, controls a camera's aperture size by controlling shutter blade position such as in U.S. Pat. No. 3,950,766 to ERLICHMAN, et al. This focus related electronic signal may also be employed to control a conventional timing circuit that controls the length of time that, for example, a strobe light would illuminate a subject to be photographed.

The known reference position mentioned above to which the movable element of the adjustable focus lens is driven in the manual focus control mode of operation is located outside of the range of lens element focusing movement. However, other known reference positions may be selected that lie either at the ends or within said range of lens element focusing movement.

If an embodiment of the present invention is incorporated in a photographic camera that has both automatic and manual focusing modes of operation, the mechanical cam heretofore employed to couple focus information to, for example, a photographic camera exposure control system can be eliminated. The automatic focus control portion of this camera may include ultrasonic distance measuring equipment as employed in the preferred embodiment of my invention or other types of cameras having both automatic and manual focusing modes of operation where means such as reflected light is employed to determine subject distance in the automatic focus control mode.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. A photographic camera operable in both automatic and manual focusing modes, said camera comprising:
    a lens variable between different positions for focusing of subjects located at different subject distances on the focal plane of the camera;
    ranging means for determining subject distance and for providing an electrical range signal indicative of subject distance;
    sensing means for producing an electrical lens position signal indicative of each lens position;
    means for comparing said range signal and said lens position signal and for automatically varying the lens to a focal position selected in accordance with said range signal;
    selectively operative means for precluding said automatic variation of the lens to the range selected position when the camera is operated in the manual mode; and
    follow focus means for controlling one or more camera functions in accordance with the focal position of the lens, said follow focus means being directly responsive to said lens position signal so that said follow focus means is operative in both automatic and manual modes of operation, but determined by the automatic selection of the lens position by said ranging means in the automatic focusing mode and by the operator selection of the lens position in the manual focusing mode.

2. In a photographic camera having automatic and manual focusing modes of operation and including an adjustable lens displaceable over a given focusing range, ranging means for determining the distance between the camera and a subject within the scene and for producing a signal indicative of a lens position selected in correspondence with the determined subject distance, energizeable drive means for displacing said lens through its focusing range, sensing means responsive to lens displacement from a reference position for sensing progressive lens positions, follow focus means for controlling one or more camera functions other than lens focusing in accordance with the lens position, means for selecting an automatic or manual focusing mode, means for initiating a camera cycle, and control means responsive to initiation of said camera cycle, when said automatic focusing is selected, for energizing said drive means to automatically displace said lens from said reference position to the range selected position in correspondence with said signal and, when said manual focusing mode is selected, for precluding displacement of the lens to said range selected position, the improvement wherein said follow focus means is responsive to said sensing means, and said control means includes means operable in the manual focusing mode for energizing said drive means to displace said lens from the manually selected position to the reference position and back to said manually selected position, whereby said sensing means and its responsive follow focus means are operative in both said automatic and manual focusing modes of operation.

3. In a photographic camera having automatic and manual focusing modes of operation and including means for defining an image plane, an adjustable focus lens displaceable over a given focusing range for focusing scene light on said image plane, ranging means for determining the distance between the camera and a subject within the scene and for producing a signal indicative of a lens position selected in correspondence with the determined subject distance, energizeable drive means for displacing said lens through its focusing range, sensing means responsive to lens displacement from a reference position for sensing progressive lens positions, follow focus means for controlling one or more camera functions other than lens focusing in accordance with the lens position, a mode switch actuatable between an automatic and manual focusing position, a camera switch actuatable for initiating a camera cycle, means coupled to said lens for facilitating manual positioning thereof, and control means responsive to actuation of said camera switch, when said mode switch is in its automatic focusing position, for energizing said drive means to automatically displace said lens from said reference position to the range selected position in correspondence with said signal and, when said mode switch is in its said manual focusing position, for precluding displacement of the lens to said range selected position, the improvement wherein said follow focus means is responsive to said sensing means, and said control means includes means for energizing said drive means to displace said lens from a manually selected position to its reference position and back to said manually selected position, when said mode switch is in its said manual position, whereby said sensing means and its responsive follow focus means is operative in both said automatic and manual focusing modes of operation.

4. A photographic camera having automatic and manual focusing modes of operation, comprising:
   means for defining an image plane;
   an adjustable focus lens displaceable over a given focusing range for directing scene light along a given optical path to said image plane;
   energizable distance sensing means for determining the distance between said camera and the position of a particular subject within said lens focusing range and for producing a signal indicative of said particular subject distance;
   mode select means actuatable between first and second states for selecting the manual or automatic focusing modes of operation;
   a manually actuatable sequence initiating switch actuatable between first and second states;
   manually actuatable drive means coupled to said lens for manually positioning said lens to a desired focus position; and
   energizable drive means responsive to said second state of said sequence initiating means, said first state of said mode switch and said particular subject distance signal for positioning said lens to a focus position that will focus an image of said subject at said image plane, and responsive to said second state of said sequence initiating means and said second state of said mode switch and not responsive to said subject distance signal, for positioning said lens from an initial focus position to a known reference position and then back to said initial focus position and for generating an electrical signal representative of said initial lens focus position.

5. The apparatus of claim 4, wherein said camera includes an exposure control system and means responsive to said initial lens focus position electrical signal for actuating said exposure control system.

6. The apparatus of claim 4, wherein said known reference position is outside of the range of focusing movement of the movable element of said adjustable focus lens.

7. The apparatus of claim 4, wherein said known reference position is within the range of focusing movement of the movable element of said adjustable focus lens.

8. The apparatus of claim 4, wherein said camera includes lens aperture controlling means responsive to said lens focus position electrical signal for controlling aperture size.

9. The apparatus of claim 8, wherein said lens aperture controlling means responsive to said lens focus position electrical signal is a stepper motor.

10. The apparatus of claim 4, wherein said camera additionally includes a stobe light and means for controlling the amount of light output produced by said strobe light and said strobe light output controlling means is responsive to said lens focus position electrical signal.

11. The apparatus of claim 4, wherein said energizable drive means includes:
   a light emitting diode;
   a light sensing transistor that senses light emitted by said diode and produces a signal responsive to said sensed diode emitted light; and
   a rotatably mounted encoder wheel, having a plurality of openings therein, mechanically coupled to a movable element of said adjustable focus lens,
   said encoder wheel and said openings therein intercepting the light path between said diode and said transistor such that rotation of said encoder wheel in response to adjustable focus lens movement causes a signal to be produced by said light sensing transistor representative of the extent of focusing movement of said adjustable focus lens.

12. The apparatus of claim 4, wherein said sequence initiating switch is the shutter actuating switch of said camera.

13. The apparatus of claim 4, wherein said energizable distance sensing means includes a capacitance type, ultrasonic energy transmitting and receiving transducer.

* * * * *